(12) United States Patent
Kusu et al.

(10) Patent No.: US 12,000,516 B2
(45) Date of Patent: Jun. 4, 2024

(54) MALE JOINT AND PIPE JOINT

(71) Applicant: NITTA CORPORATION, Osaka (JP)

(72) Inventors: Yasunori Kusu, Nabari (JP); Mizuho Hitotsubashi, Nabari (JP)

(73) Assignee: NITTA CORPORATION, Osaka (JP)

( * ) Notice: Subject to any disclaimer, the term of this patent is extended or adjusted under 35 U.S.C. 154(b) by 77 days.

(21) Appl. No.: 17/918,700

(22) PCT Filed: Oct. 8, 2020

(86) PCT No.: PCT/JP2020/038080
§ 371 (c)(1),
(2) Date: Oct. 13, 2022

(87) PCT Pub. No.: WO2021/210199
PCT Pub. Date: Oct. 21, 2021

(65) Prior Publication Data
US 2023/0144687 A1    May 11, 2023

(30) Foreign Application Priority Data
Apr. 16, 2020  (JP) .................................. 2020-073483

(51) Int. Cl.
*F16L 37/32* (2006.01)
*F16K 1/46* (2006.01)
(Continued)

(52) U.S. Cl.
CPC ................ *F16L 37/32* (2013.01); *F16K 1/46* (2013.01); *F16K 15/184* (2021.08); *F16L 37/22* (2013.01); *F16L 37/23* (2013.01)

(58) Field of Classification Search
CPC . F16L 37/32; F16L 37/23; F16L 37/22; F16K 1/46; F16K 15/184; Y10T 137/87957
See application file for complete search history.

(56) References Cited

U.S. PATENT DOCUMENTS 3,500,859 A * 3/1970 Pearson ................... F16L 37/32
251/149.8
3,525,361 A * 8/1970 Cerbin .................... F16L 29/04
137/614.04
(Continued)

FOREIGN PATENT DOCUMENTS

JP    S52-118223 U1    9/1977
JP    S58-187687 U1    12/1983
(Continued)

OTHER PUBLICATIONS

International Search Report dated Dec. 1, 2020 in International Application No. PCT/JP2020/038080.

*Primary Examiner* — David Colon-Morales
(74) *Attorney, Agent, or Firm* — Wentsler LLC

(57) ABSTRACT

A male joint includes a male joint main body and a valve element provided coaxially with a central axis of the male joint main body. The valve element includes a shaft portion and a valve portion coaxially provided at a tip end of the shaft portion. The valve portion has a first surface intersecting with the central axis and a second surface that is connected to an outer edge of the first surface and extends along the central axis from the first surface to a base end at a base end portion. The valve portion further comprising a groove having an annular shape centered on the central axis at a side portion and a deformation portion on a base end side of the groove.

4 Claims, 8 Drawing Sheets

(51) Int. Cl.
*F16K 15/18* (2006.01)
*F16L 37/22* (2006.01)
*F16L 37/23* (2006.01)

(56) References Cited

U.S. PATENT DOCUMENTS

| | | | | |
|---|---|---|---|---|
| 3,788,348 | A | * | 1/1974 | Johnson ............... F16L 37/23 137/614.04 |
| 4,068,869 | A | * | 1/1978 | Maruyama ............ F16L 37/32 285/321 |
| 4,289,164 | A | * | 9/1981 | Ekman ................. F16L 37/23 137/614.03 |
| 4,485,845 | A | * | 12/1984 | Brady .................. F16L 37/32 137/614.04 |
| 4,682,795 | A | * | 7/1987 | Rabushka ............. F16L 37/32 285/83 |
| 5,464,042 | A | * | 11/1995 | Haunhorst ......... F24F 13/0209 137/614.04 |
| 5,709,243 | A | * | 1/1998 | Wells .................. F16L 37/34 137/614.01 |
| 6,871,837 | B2 | * | 3/2005 | Mikiya ................ F16L 37/32 137/614.04 |
| 7,708,029 | B2 | * | 5/2010 | Kitagawa ............. F16L 37/34 251/149.6 |
| 7,921,875 | B2 | * | 4/2011 | Moriiki ............... F16L 37/32 137/614.04 |
| 8,246,085 | B2 | * | 8/2012 | Kitagawa ............. F16L 37/23 137/614.04 |
| 2009/0091129 | A1 | | 4/2009 | Moriiki et al. |
| 2019/0285207 | A1 | | 9/2019 | Hayashi et al. |
| 2019/0368642 | A1 | | 12/2019 | Saga et al. |

FOREIGN PATENT DOCUMENTS

| | | | |
|---|---|---|---|
| JP | H11-511537 | | 10/1999 |
| JP | 2005-140240 | | 6/2005 |
| JP | 2009-97714 | | 5/2009 |
| JP | 2013-167305 | | 8/2013 |
| JP | 2013167305 | A * | 8/2013 |
| JP | 2018-025277 | | 2/2018 |
| JP | 2018-123848 | | 8/2018 |
| WO | 2018/062431 | | 4/2018 |
| WO | WO-2018138997 | A1 * | 8/2018 ............. F16L 37/23 |
| WO | WO-2021049171 | A1 * | 3/2021 ............. F16L 37/23 |

* cited by examiner

MALE JOINT AND PIPE JOINT

TECHNICAL FIELD

The present invention relates to a male joint and a pipe joint.

BACKGROUND ART

Conventionally, as a pipe joint between hoses for transferring a fluid such as water or oil under high pressure, a quick pipe joint using a valve element is known (for example, PTL 1).

PTL 1 discloses a valve element including a valve tip end side member, a valve rear end side member, and a seal member, in which the seal member is fitted in a groove formed by the valve tip end side member and the valve rear end side member.

CITATION LIST

Patent Literature

PTL 1: JP 2018-25277 A

SUMMARY OF THE INVENTION

Technical Problem

In the case of PTL 1, since the groove for fitting the seal member is formed by the valve tip end side member and the valve rear end side member, there is a concern that such structure is complicated and versatility is low.

An object of the present invention is to provide a male joint and a pipe joint with a simpler structure.

Solution to Problem

A male joint according to the present invention includes a male joint main body having a cylindrical shape and a valve element provided coaxially with a central axis of the male joint main body in the male joint main body, wherein the valve element includes a shaft portion having a shaft shape and a valve portion having a disk shape coaxially provided at a tip end of the shaft portion; the valve portion includes a base end portion to which the tip end of the shaft portion is connected, a tip end portion opposite to the base end portion, and a side portion between the base end portion and the tip end portion; the base end portion includes a first surface intersecting with the central axis and a second surface connected to an outer edge of the first surface and extending from the first surface to the base end along the central axis; the side portion includes an annular groove centered on the central axis and a deformation portion on a base end side of the groove; the groove includes a bottom surface along the central axis and a pair of inner surfaces extending radially outward from both end portions of the bottom surface in the central axis direction; and the deformation portion includes a thin portion in which a thickness between, a connection portion between the first surface and the second surface, and a connection portion between an inner surface on a base end side of the pair of inner surfaces and the bottom surface is partially thin.

A pipe joint according to the present invention includes the male joint and a female joint into which the male joint is inserted.

Advantageous Effects of the Invention

According to the present invention, since the groove for mounting an O-ring is formed of a single valve portion, it is possible to provide a male joint and a pipe joint with a simpler structure.

DESCRIPTION OF EMBODIMENTS

Hereinafter, embodiments of the present invention will be described in detail with reference to the drawings. In the following description, unless otherwise specified, a direction parallel to the central axis is simply referred to as an "axial direction", a radial direction centered on the central axis is simply referred to as a "radial direction", and a circumferential direction centered on the central axis, that is, around the central axis is simply referred to as a "circumferential direction". In addition, in the present description, a "parallel direction" also includes a substantially parallel direction, and an "orthogonal direction" also includes a substantially orthogonal direction.

Figure 1:
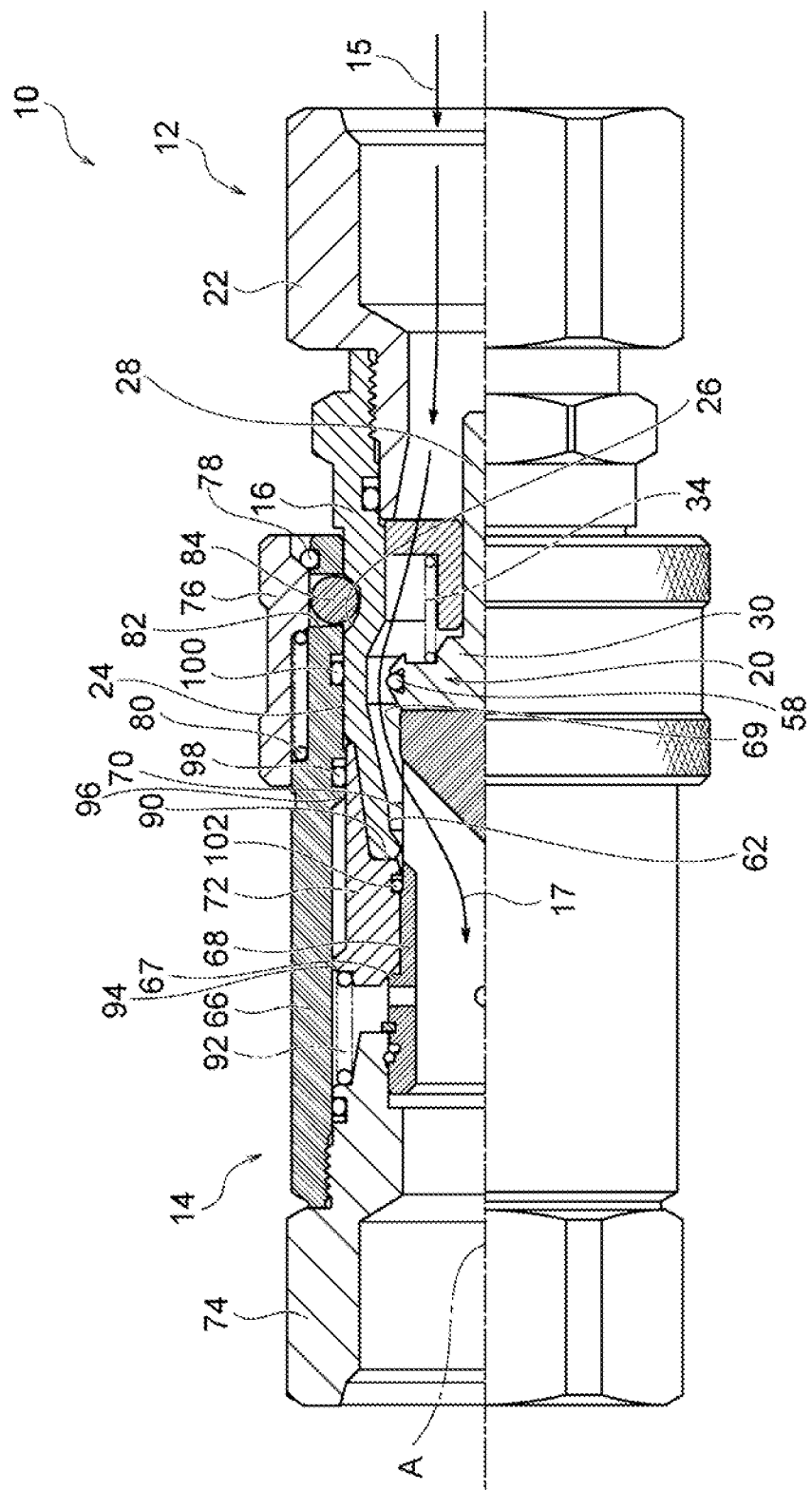
FIG. 1 A partial cross-sectional view of a pipe joint according to the present embodiment.

A pipe joint 10 shown in FIG. 1 is a quick pipe joint including a male joint 12 and a female joint 14 into which the male joint 12 is inserted. Although not illustrated, the male joint 12 and the female joint 14 are connected to different pipes. The male joint 12 has a flow path 15. The female joint 14 has a flow path 17. The pipe joint 10 connects the male joint 12 and the female joint 14 to connect the flow path 15 and the flow path 17.

(Male Joint)

Figure 2:
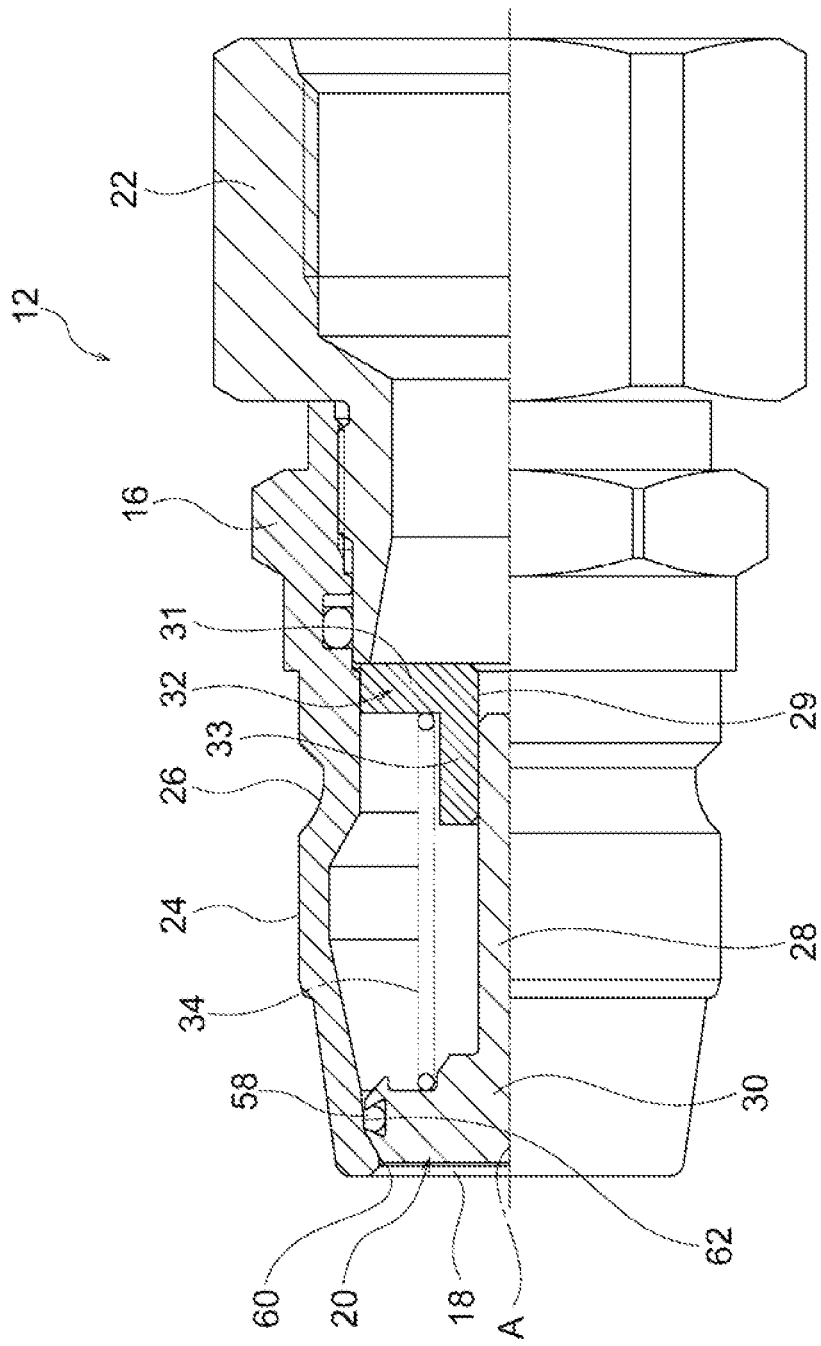
FIG. 2 A partial cross-sectional view of a male joint.

As illustrated in FIG. 2, the male joint 12 includes a male joint main body 16, a valve element 20, a first cap 22, a holder 32, and a coil spring 34, all of which are made of metal. In the male joint 12, a first orifice 18 provided at the tip end in the axial direction can be opened and closed by the valve element 20, and the first cap 22 is provided at the base end in the axial direction.

The male joint main body 16 is a cylindrical member, has the first orifice 18 at the tip end, has an outer peripheral seal surface 24 and an annular concave portion 26 on an outer periphery, and has a female screw formed on an inner peripheral surface at a base end. The outer peripheral seal surface 24 is enlarged in diameter from the tip end of the male joint main body 16 and has a smooth shape continuous in the circumferential direction. The annular concave portion 26 is on the base end side of the outer peripheral seal surface 24, and has a concave shape with a reduced diameter and continuous in the circumferential direction. The male joint main body 16 has a tapered shape on the tip end side from the outer peripheral seal surface 24.

The inner peripheral surface of the male joint main body 16 has a tapered shape toward the tip end, and has a first annular protrusion 60 at the tip end and a first seal surface 62 on the base end side of the first annular protrusion 60. The first annular protrusion 60 annularly protrudes inward from the tip end of the male joint main body 16 toward a central axis A. The first seal surface 62 is inclined toward the central axis A toward the tip end. The first cap 22 is a cylindrical member, a male screw complementary to the female screw of the male joint main body 16 is formed on an outer peripheral surface, and is screwed into the above female screw to be fixed to the base end of the male joint main body 16.

The holder 32 includes a disk-shaped bottom portion 31 having a tip end surface and a base end surface, and a shaft-shaped support portion 33 whose longitudinal direction is an axial direction and a base end of which is connected to a center of the tip end surface. A support hole 29 penetrating in the axial direction from the center of the tip end of the support portion 33 to the base end surface is formed. A plurality of holes (not illustrated) penetrating in the axial direction are formed around a connection portion between the bottom portion 31 and the support portion 33. The base end surface of the bottom portion 31 is in contact with the tip end of the first cap 22 fixed to the male joint main body 16. The support portion 33 is inserted into the base end of the coil spring 34. The coil spring 34 is arranged to be able to expand and contract in the axial direction. The base end of the coil spring 34 is in contact with the tip end surface of the bottom portion 31.

(Valve Element)

The valve element 20 includes a shaft portion 28 having a shaft shape whose longitudinal direction is the axial direction, and a valve portion 30 integrally formed at a tip end of the shaft portion 28. A base end of the shaft portion 28 is inserted into the support hole 29 of the holder 32. The shaft portion 28 is supported by the support portion 33 in such a way that it can move in the axial direction.

Figure 3:
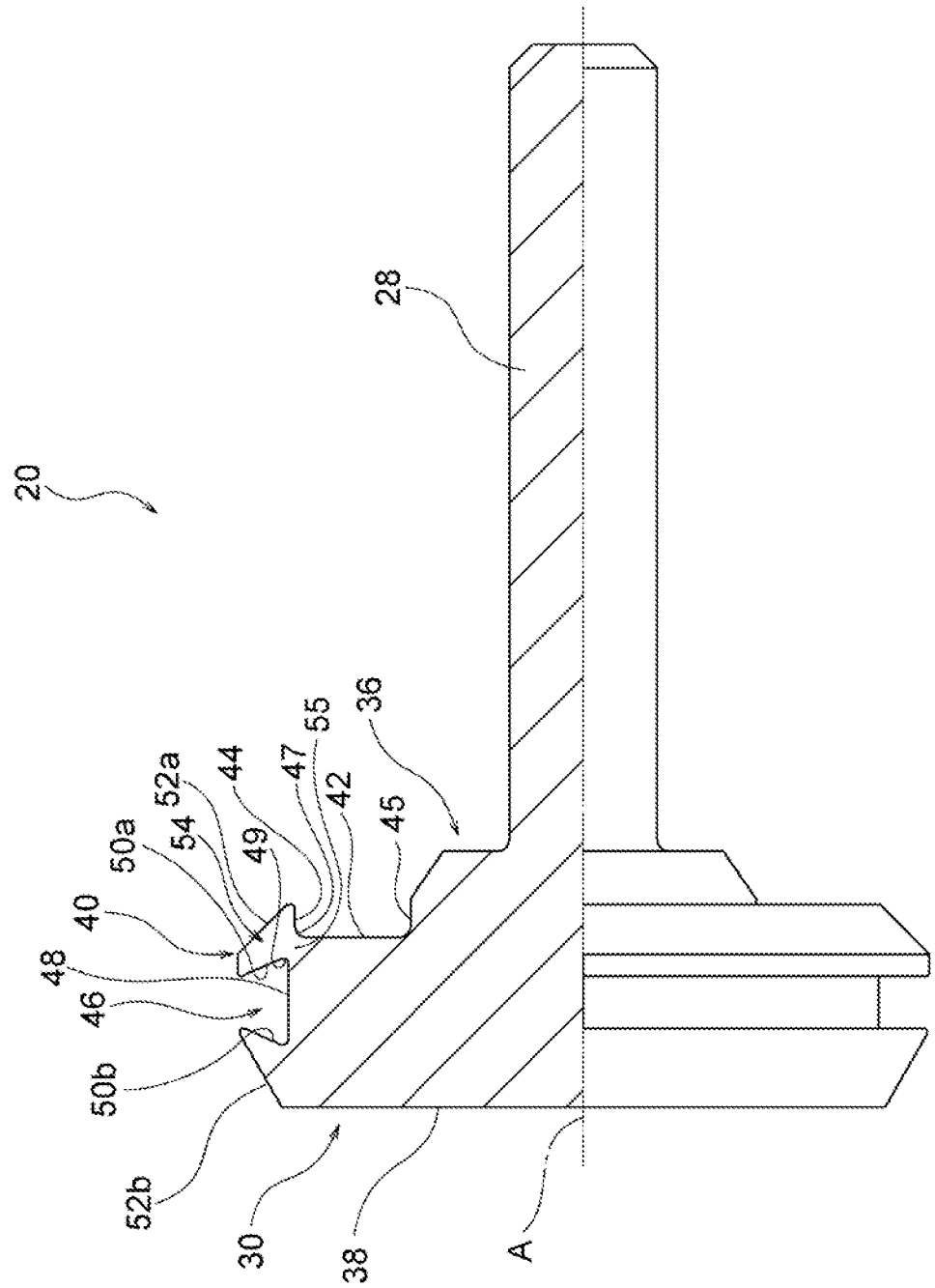
FIG. 3 A partial cross-sectional view of a valve element.

The valve portion 30 has a disk shape and is arranged coaxially with the shaft portion 28. As illustrated in FIG. 3, the valve portion 30 includes a base end portion 36 to which the tip end of the shaft portion 28 is connected, a tip end portion 38 opposite to the base end portion 36, and a side portion 40, facing radially outward, between the base end portion 36 and the tip end portion 38.

The base end portion 36 has a first surface 42 extending radially outward from the central axis A, a second surface 44 connected to the outer edge of the first surface 42 and extending from the outer edge of the first surface 42 toward the base end along the central axis A, and a third surface 45 extending from an inner edge of the first surface 42 toward the base end along the central axis A. The first surface 42 is an annular surface centered on the shaft portion 28. The second surface 44 and the third surface 45 face each other in the radial direction. The second surface 44 has a cylindrical inner surface shape, in which the front end in the axial direction is connected to the outer edge of the first surface 42, and a rear end in the axial direction extends to a base end along the central axis A. The third surface 45 has a cylindrical outer surface shape, in which the front end in the axial direction is connected to the inner edge of the first surface 42, and a rear end in the axial direction is connected to the shaft portion 28.

The inner edge of the first surface 42 is connected to the front end of the third surface 45, and the outer edge of the first surface 42 is connected to the front end of the second surface 44. A connection portion 47 between the outer edge of the first surface 42 and the front end of the second surface 44 is an R-shaped concave surface.

Figure 4:
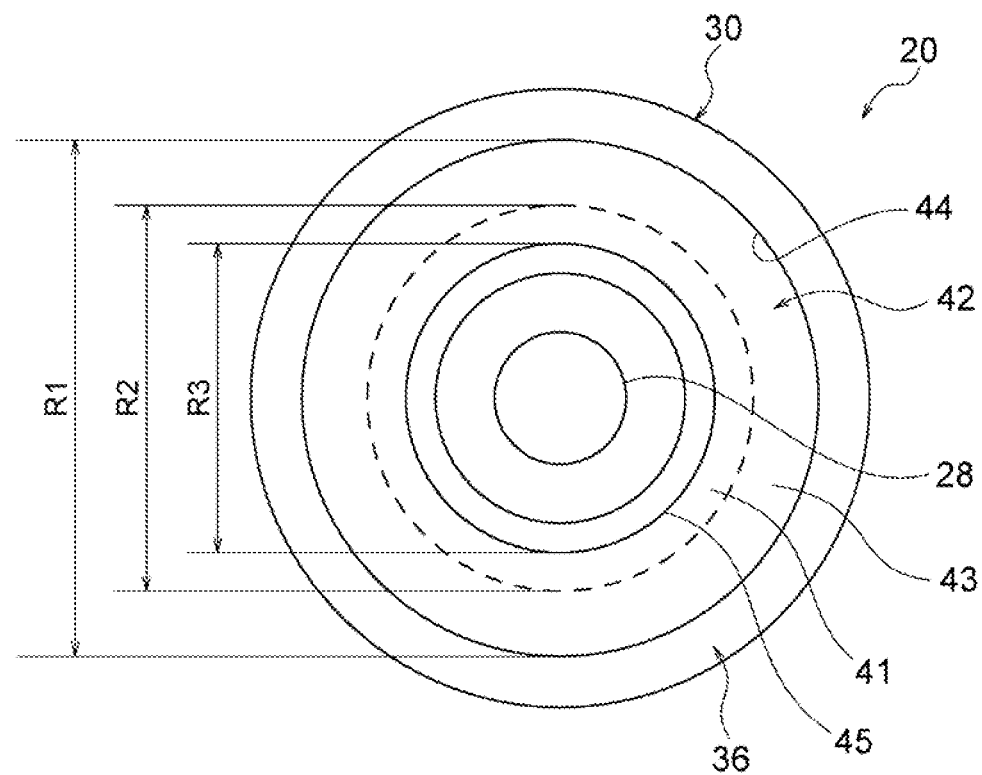
FIG. 4 A right side view of the valve element.

As illustrated in FIG. 4, the first surface 42 includes an annular first region 41 centered on the shaft portion 28, and an annular second region 43, on the radially outer side, that is concentric with the first region 41. The inner edge of the first region 41 is connected to the front end of the third surface 45, and the outer edge of the first region 41 is connected to the inner edge of the second region 43. The inner edge of the second region 43 is connected to the outer edge of the first region 41, and the outer edge of the second region 43 is connected to the front end of the second surface 44. The base end portion 36 has the second region 43 wider than the first region 41 on the radially outer side of the first region 41. In a case where an outer diameter of the second region 43 is R1, an inner diameter of the second region 43 and an outer diameter of the first region 41 are R2, and an inner diameter of the first region 41 is R3, the difference between the outer diameter R1 and the inner diameter R2 of the second region 43 is larger than the difference between the outer diameter R2 and the inner diameter R3 of the first region 41.

The third surface 45 has an outer diameter similar to or smaller than the outer diameter of the support portion 33 of the holder 32, and is inserted into the tip end of the coil spring 34. The outer diameter of the third surface 45 is the same as the inner diameter R3 of the first region 41. The tip end of the coil spring 34 is in contact with the first surface 42 in the first region 41. The coil spring 34 is arranged between the bottom portion 31 of the holder 32 and the base end portion 36 of the valve element 20 to press the valve element 20 in the tip end direction.

Figure 5:
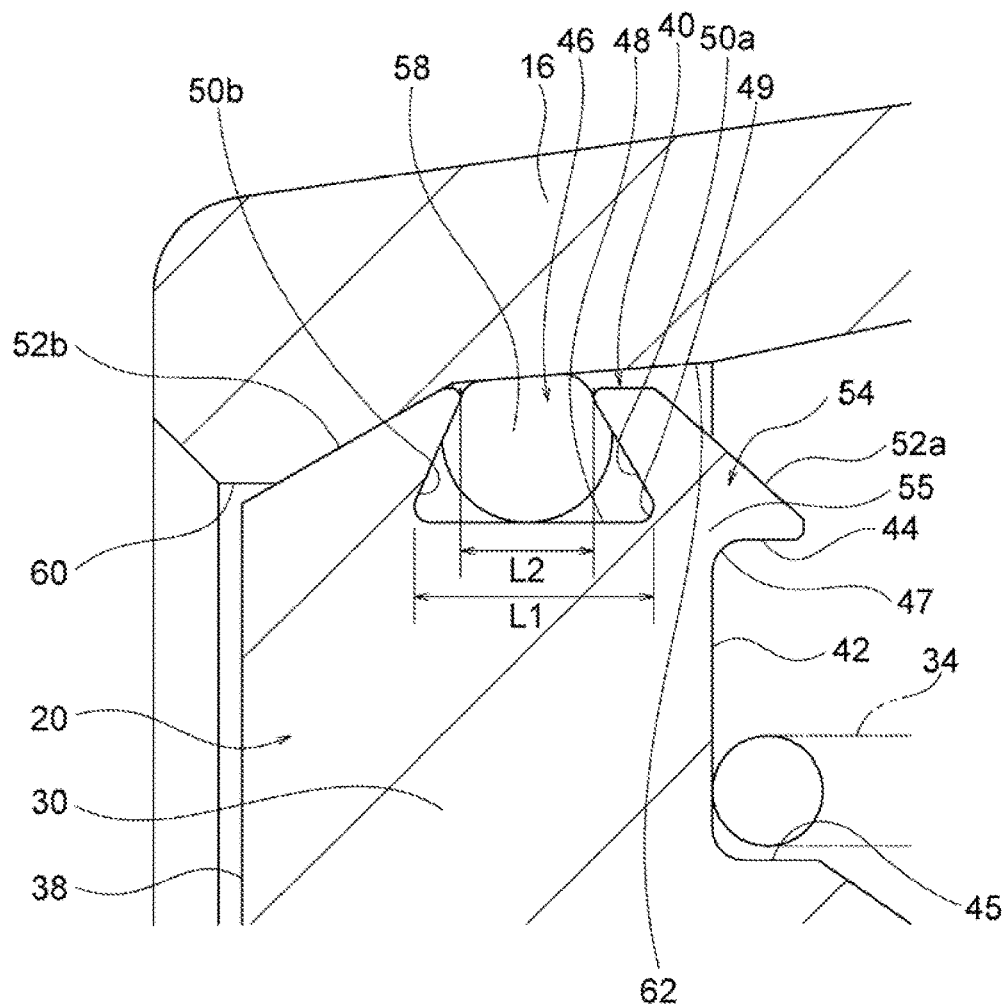
FIG. 5 A partially enlarged cross-sectional view of the male joint.

As illustrated in FIG. 5, the side portion 40 includes an annular groove 46 extending in the circumferential direction and a deformation portion 54 on the base end side in the axial direction of the groove 46. The groove 46 has an opening radially outward. An O-ring 58 is mounted to the groove 46.

The groove 46 has, in the cross section including the central axis A, a bottom surface 48 with a cylindrical outer surface shape along the axial direction and a pair of inner surfaces 50*a* and 50*b* extending radially outward from both end portions of the bottom surface 48 in the axial direction. A pair of outer surfaces 52*a* and 52*b* is respectively arranged on the outer side in the axial direction from the pair of inner surfaces 50*a* and 50*b*. The pair of inner surfaces 50*a* and 50*b* is inclined inward in the axial direction as going radially outward. The pair of outer surfaces 52*a* and 52*b* is inclined inward in the axial direction as going radially outward. The angle with respect to the radial direction is smaller in the inner surfaces 50*a* and 50*b* than in the outer surfaces 52*a* and 52*b*.

The pair of inner surfaces 50*a* and 50*b* intersects the bottom surface 48 at an acute angle. A connection portion 49 between the inner surface 50*a* arranged on the base end side in the axial direction in the groove 46 and the base end in the axial direction in the bottom surface 48 is an R-shaped concave surface. An axial length of the bottom surface 48 is L1, and an axial length between the pair of inner surfaces 50*a* and 50*b* in the opening of the groove 46 is L2. The length L2 is the minimum length between the pair of inner surfaces 50*a* and 50*b*. The length L1 is longer than a wire diameter of the O-ring 58. The wire diameter of the O-ring 58 is the thickness of the O-ring cross section. The length L2 is shorter than the wire diameter of the O-ring 58. A part of the O-ring 58 mounted to the groove 46 protrudes radially outward from the opening of the groove 46. A part of the O-ring 58 may be in contact with the pair of inner surfaces 50*a* and 50*b*. The O-ring 58 may be compressed by the pair of inner surfaces 50*a* and 50*b*. The valve element 20 closes the first orifice 18 when the O-ring 58 comes into contact with the first seal surface 62.

The outer surface 52*a* arranged on the base end side in the axial direction from the groove 46 is connected to the second surface 44 and intersects with the second surface 44 at an acute angle. R processing or chamfering processing is performed between the outer surface 52*a* and the second surface 44. The outer surface 52*b* arranged on the tip end side in the axial direction from the groove 46 is connected to the tip end portion 38. The outer surface 52*b* is in contact with the first annular protrusion 60. The tip end portion 38 has a surface extending in the radial direction.

The deformation portion 54 is a portion deformed by caulking process to be described later. The deformation portion 54 is a portion mainly surrounded by the connection portion 49, the inner surface 50*a*, the outer surface 52*a*, the second surface 44, and the connection portion 47. The deformation portion 54 has a thin portion 55 in which the thickness between, the connection portion 47 between the first surface 42 and the second surface 44, and the connection portion 49 between the inner surface 50*a* and the bottom surface 48 is partially thin. The deformation portion 54 has a thick portion surrounded by the inner surface 50*a*, the outer surface 52*a*, and the second surface 44.

Figure 6A:
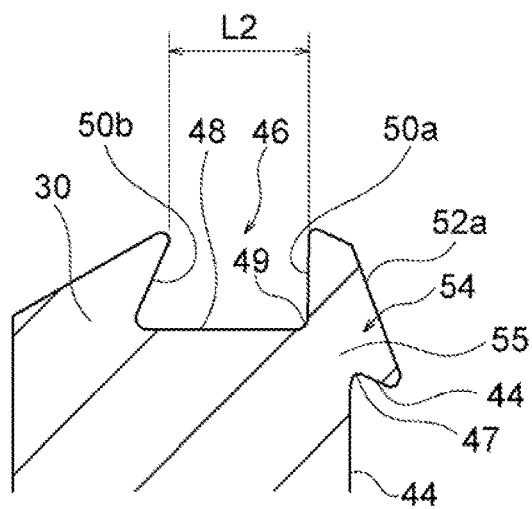
FIG. 6A A partially enlarged cross-sectional view of the valve element before caulking.

A method of mounting the O-ring 58 to the valve portion 30 will be described. To start with, the valve portion 30 before the O-ring 58 is mounted will be described with reference to FIG. 6A. Before the O-ring 58 is mounted, the inner surface 50*a* arranged on the base end side in the axial direction in the groove 46 is formed so as to intersect the bottom surface 48 at a right angle. In other words, the inner surface 50*a* is along the radial direction, and the length L2 is longer than the wire diameter W of the O-ring 58. Furthermore, the inner surface 50*b* is formed in such a way that it is inclined inward in the axial direction as proceeding radially outward. Such valve portion 30 can be formed by cutting process. The length from the central axis A to the connection portion between the inner surface 50*a* and the outer surface 52*a* is formed to be equal to the length from the central axis A to the connection portion between the inner surface 50*b* and the outer surface 52*b* after the caulking process.

Figure 6B:
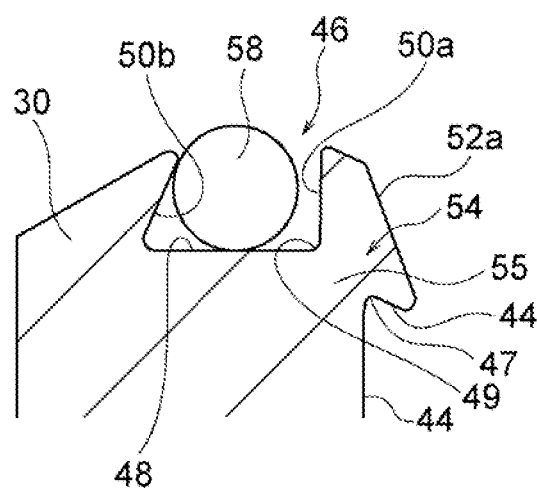
FIG. 6B A partially enlarged cross-sectional view in a state where the O-ring is mounted to the valve element.
Figure 6C:
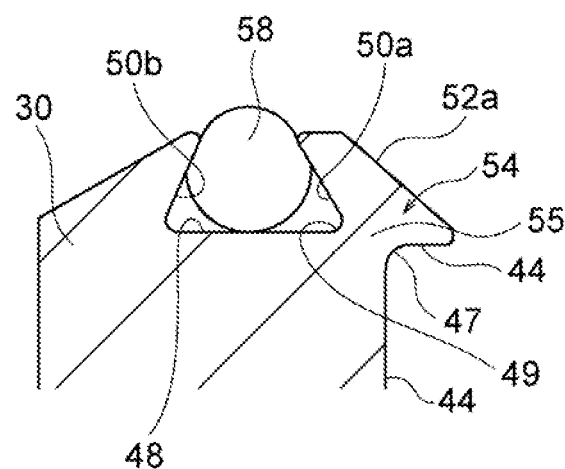
FIG. 6C A partially enlarged cross-sectional view of the valve element after caulking of the valve element.

The O-ring 58 is mounted to the groove 46 having such a wide opening (FIG. 6B). Since the opening is wide, the O-ring 58 can be easily mounted to the groove 46. Next, a force is applied to the outer surface 52*a* in the tip end direction to perform caulking process. The deformation portion 54 is caulked over the entire circumferential direction until the length L2 becomes shorter than the wire diameter W of the O-ring 58 (FIG. 6C). The length L2 may be appropriately adjusted according to a deformation amount of the deformation portion 54. The larger the deformation amount of the deformation portion 54, that is, the shorter the axial length L2, the stronger the force with which the groove 46 restrains the O-ring 58. As described above, the O-ring 58 can be mounted to the groove 46.

(Female Joint)

Figure 7:
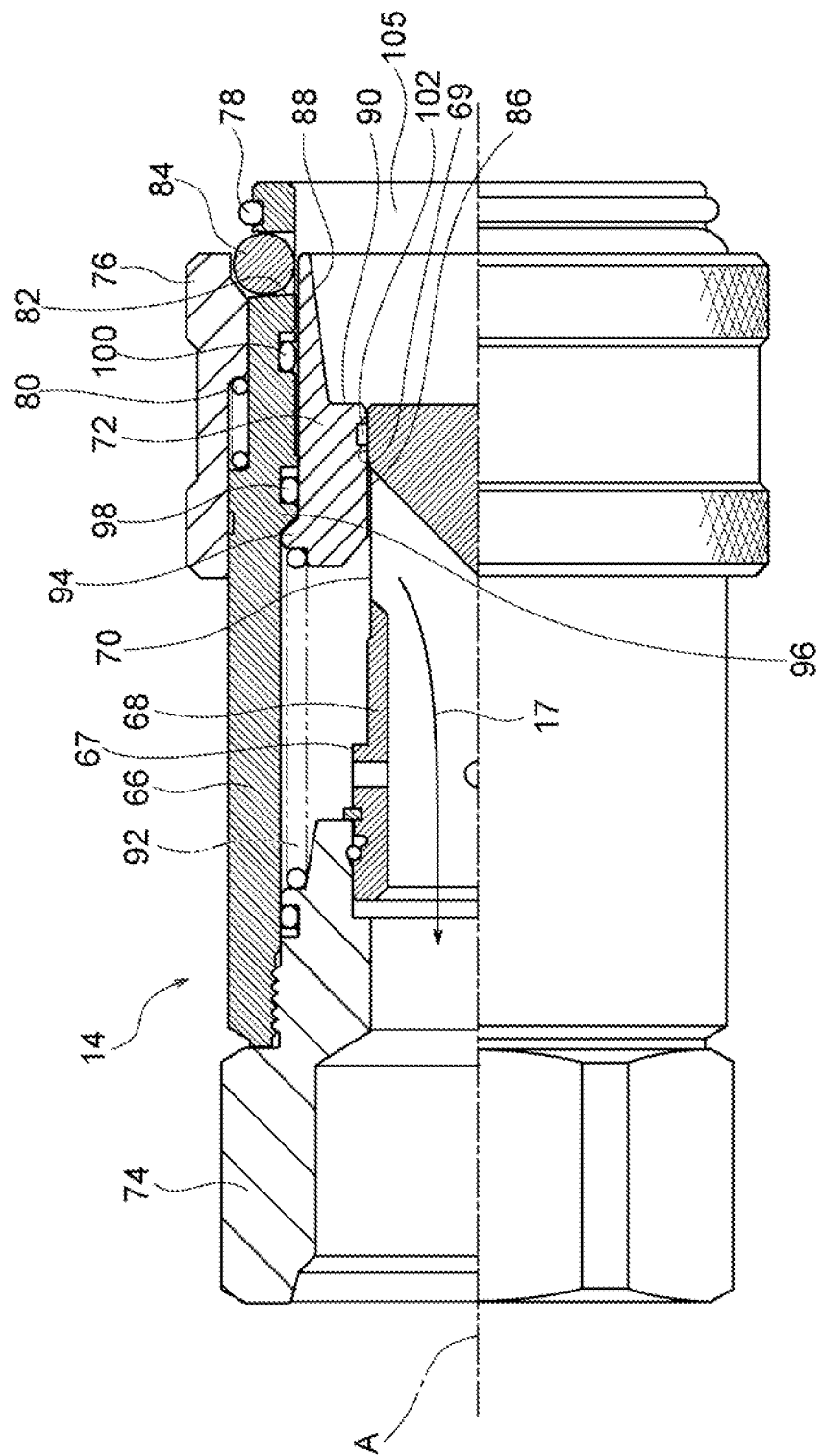
FIG. 7 A partial cross-sectional view of a female joint.

As illustrated in FIG. 7, the female joint 14 includes a female joint main body 66, a distribution pipe 68 provided in the female joint main body 66, and a sleeve 72 that moves in the axial direction between the female joint main body 66 and the distribution pipe 68 to open and close a second orifice 70, all of which are made of metal.

The female joint main body 66 is a cylindrical member in which the female screw is formed on the inner peripheral surface of a base end, and includes a second cap 74 at the base end and an operation body 76 on the tip end side. The second cap 74 is a cylindrical member in which a male screw complementary to the female screw of the female joint main body 66 is formed on the outer peripheral surface, and is screwed into the female screw to be fixed to the female joint main body 66.

A snap ring 78 is mounted to the outer peripheral surface of the tip end of the female joint main body 66. The female joint main body 66 includes, on the base end side from the snap ring 78, a through hole 82 penetrating in the radial direction and a sphere 84 accommodated in the through hole 82. The through hole 82 has a tapered shape from the outside to the inside in the radial direction such that the sphere 84 is movable in the radial direction and does not fall off to the inside of the female joint main body 66. A part of the sphere 84 protrudes from the through hole 82 into the female joint main body 66.

The inner peripheral surface of the female joint main body 66 has a second annular protrusion 96 in the vicinity of the center in the axial direction, a first seal portion 98 on the tip end side of the second annular protrusion 96, and a second seal portion 100 on the tip end side from the first seal portion 98. The second annular protrusion 96 annularly protrudes inward from the inner peripheral surface of the female joint main body 66 toward the central axis A. The first seal portion 98 and the second seal portion 100 have an annular shape extending in the circumferential direction. The second seal portion 100 is in contact with the outer peripheral seal surface 24 of the male joint main body 16.

The operation body 76 is a cylindrical member, is externally inserted to the tip end side of the female joint main body 66, and is held by the female joint main body 66 when the inner surface of the tip end side comes into contact with the snap ring 78. The operation body 76 is pressed in the tip end direction by a coil spring 80 as an elastic portion provided between the base end of the operation body 76 and the female joint main body 66.

The distribution pipe 68 is a columnar member, and has the flow path 17 penetrating between the center of the base end and the second orifice 70 on the side surface on the other end side. The base end of the distribution pipe 68 is fixed to the second cap 74. The distribution pipe 68 has a second seal surface 69 on the outer peripheral surface on the tip end side more than the second orifice 70.

The sleeve 72 is a cylindrical member and has a first inner peripheral surface 86 with a cylindrical inner surface shape along the axial direction, a second inner peripheral surface 88 with a cylindrical inner surface shape provided coaxially with the first inner peripheral surface 86, and an annular abutment surface 90, along the radial direction, connecting a tip end of the first inner peripheral surface 86 and a base end of the second inner peripheral surface 88. The second inner peripheral surface 88 has the inner diameter at the base end larger than the inner diameter of the first inner peripheral surface 86 and is inclined such that the inner diameter increases from the base end to the tip end.

A coil spring 92 as an elastic portion is provided between the sleeve 72 and the second cap 74. The base end of the coil spring 92 is in contact with the tip end of the second cap 74, and the tip end of the coil spring 92 is in contact with the base end of the sleeve 72. The sleeve 72 is pressed toward the tip end side of the female joint main body 66 by the coil spring 92. A claw 94 provided on the outer peripheral surface is in contact with the second annular protrusion 96, so that the sleeve 72 is held in the female joint main body 66.

A space between the sleeve 72 and the female joint main body 66 is sealed by the first seal portion 98. The first seal portion 98 is always in contact with the outer peripheral surface that is the cylindrical outer surface of the sleeve 72 in the entire stroke in which the sleeve 72 moves in the axial direction. In the present embodiment, the second seal portion 100 may not be in contact with the outer peripheral surface of the sleeve 72. Furthermore, in the present description, the seal portion is preferably a squeeze packing, and for example, an O-ring, a D-ring having a D-shaped cross section, an X-ring having an X-shaped cross section, a T-ring having a T-shaped cross section, or the like can be used.

A third seal portion 102 in contact with the second seal surface 69 of the distribution pipe 68 is provided on the first inner peripheral surface 86 of the sleeve 72. When the third seal portion 102 is in contact with the second seal surface 69 of the distribution pipe 68, the sleeve 72 closes the second orifice 70 with respect to a female opening 105. When the sleeve 72 moves to the base end side and the third seal portion 102 separates from the second seal surface 69, the sleeve 72 opens the second orifice 70 with respect to the female opening 105.

(Operation and Effect)

To start with, procedures for connecting the male joint 12 and the female joint 14 will be described. Each of the first cap 22 and the second cap 74 has a female screw on the inner peripheral surface, and a tube (not illustrated) is connected thereto.

In the male joint 12, the valve element 20 is at a position on the tip end side of the male joint main body 16 (hereinafter, also referred to as a starting point), and the O-ring 58 is in contact with the first seal surface 62, so that the first orifice 18 is closed to prevent fluid leakage (FIG. 2). In a state where the female joint 14 is not connected to the male joint 12, the sleeve 72 is at a position on the tip end side of the female joint main body 66 (hereinafter, also referred to as a starting point), and the third seal portion 102 is in contact with the second seal surface 69 of the distribution pipe 68, so that the second orifice 70 is closed with respect to the female opening 105 to prevent fluid leakage (FIG. 7).

When the tip end of the male joint 12 is inserted into the tip end of the female joint 14 in a state where the operation body 76 is moved to the base end side, the tip end of the male joint main body 16 comes into contact with the abutment surface 90 of the sleeve 72. When the male joint 12 is further inserted, the outer peripheral seal surface 24 pushes up the sphere 84 radially outward and enters in a state of being in contact with the second seal portion 100, and the sleeve 72 is retracted by the male joint main body 16. When the sleeve 72 is further retracted, the third seal portion 102 separates from the second seal surface 69, so that the second orifice 70 opens with respect to the female opening 105. In the female joint 14, the first seal portion 98 is in contact with the outer peripheral surface of the sleeve 72, and in the male joint 12, the second seal portion 100 is in contact with the outer peripheral seal surface 24. In this manner, the pipe joint 10 prevents fluid leakage. On the other hand, the tip end of the distribution pipe 68 comes into contact with the valve element 20, and the valve element 20 retreats. When the O-ring 58 is separated from the first seal surface 62, the first orifice 18 is opened.

The sleeve 72 stops when the rear end reaches a stop portion 67 of the distribution pipe 68. When the sleeve 72 stops, the sphere 84 moves radially inward and enters the annular concave portion 26 partially. When the sphere 84 moves radially inward, the operation body 76 can move to the tip end side. By moving to the tip end side, the operation body 76 fixes the sphere 84 in a state of being pushed radially inward. The male joint 12 and the female joint 14 are fixed in a state of being connected by the sphere 84. In this manner, the pipe joint 10 connects the flow path 15 and the flow path 17 by connecting the male joint 12 and the female joint 14. The fluid supplied to the male joint 12 flows to the pipe connected to the female joint 14 via the pipe joint 10.

Next, procedures for separating the male joint 12 and the female joint 14 will be described. The operation body 76 is moved to the base end side. Then, the sphere 84 can move radially outward. Next, when the male joint 12 is pulled out from the female joint 14, the male joint 12 moves in the base end direction while pushing the sphere 84 radially outward. The sleeve 72 advances until the claw 94 comes into contact with the second annular protrusion 96 of the female joint main body 66 in a state where the abutment surface 90 is in contact with the tip end of the male joint 12. At this time, the third seal portion 102 passes through the second orifice 70 and reaches the second seal surface 69. In this manner, the pipe joint 10 separates the male joint 12 and the female joint 14. In the male joint 12 separated from the female joint 14, the first orifice 18 is closed by the valve element 20 returned to the starting point. In the female joint 14 separated from the male joint 12, the second orifice 70 is closed with respect to the female opening 105 by the sleeve 72 returned to the starting point.

The groove 46 for mounting the O-ring 58 is formed in the valve portion 30. Therefore, since the groove 46 can be formed by the single valve portion 30, the structure of the male joint 12 can be simplified.

Since the deformation portion 54 has the thin portion 55 in which the thickness between, the connection portion 47 between the first surface 42 and the second surface 44, and the connection portion 49 between the inner surface 50a on the base end side and the bottom surface 48, is partially thin, the caulking process can be more easily performed. Since the deformation portion 54 has the thick portion surrounded by the inner surface 50a, the outer surface 52a, and the second surface 44, it is possible to maintain a mechanical strength after the caulking process.

Since the groove 46 presses the O-ring 58 by being caulked, a restraining force of the O-ring 58 can be strengthened. Therefore, the valve element 20 can more reliably prevent the O-ring 58 from falling off. Since the deformation amount of the deformation portion 54 can be changed by caulking, the length L2 can be easily adjusted.

Since the axial length of the bottom surface 48 is longer than the wire diameter of the O-ring 58, that is, filling rate of the O-ring in the groove 46 does not exceed 100%, the O-ring 58 is elastically deformed. Therefore, sealability by the O-ring 58 mounted to the groove 46 can be more reliably obtained.

Modified Examples

The present invention is not limited to the above embodiment, and can be appropriately changed within the scope of the gist of the present invention.

In the above embodiment, the case where the inner surface 50a arranged on the base end side in the axial direction in the groove 46 is formed in such a way that the bottom surface 48 is intersected at a right angle before the O-ring 58 is mounted has been described, but the present invention is not limited thereto. Before the O-ring 58 is mounted, the inner surface 50a may be inclined inward in the axial direction of the groove 46 as proceeding radially outward with respect to the bottom surface 48. In this case, the angle of the inner surface 50a with respect to the bottom surface 48 may be about the same as that of the inner surface 50b, and the length L2 may be shorter than the wire diameter W of the O-ring 58 within a range in which the O-ring 58 can be mounted. After the O-ring 58 is mounted to the groove 46, a force is applied to the outer surface 52a in the tip end direction and further caulking process is performed, so that it is possible to form a groove in which a force for restraining the O-ring 58 is further increased with a smaller deformation amount than in the above embodiment. By reducing the deformation amount, an effect of improving dimensional accuracy of L2 after the caulking process and an effect of suppressing wear of a jig or the like due to reduction of a caulking load are expected.

Figure 8:
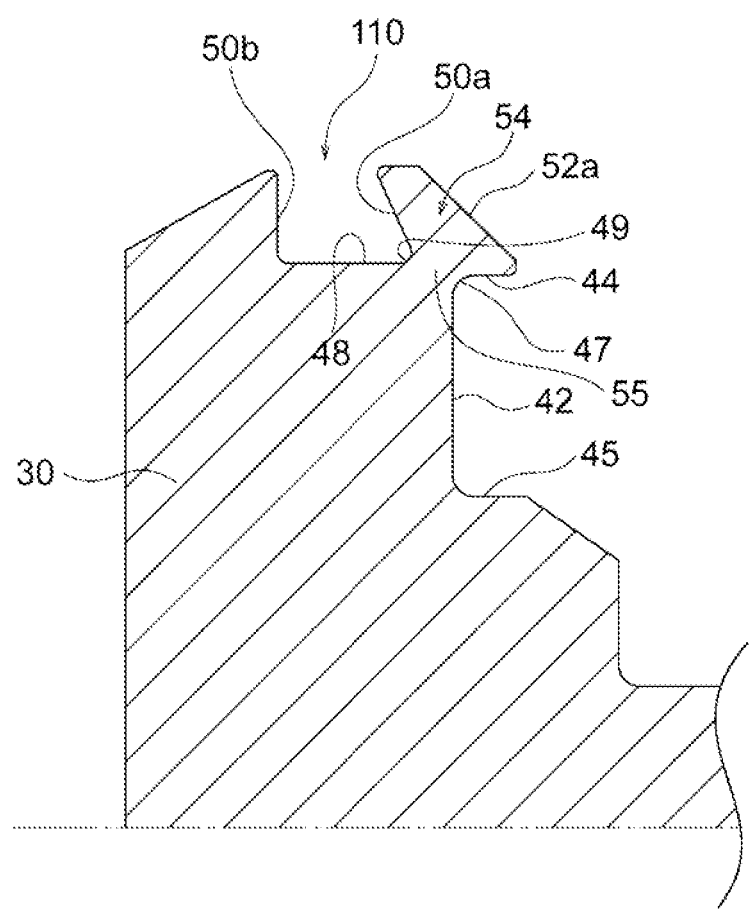
FIG. 8 A partially enlarged cross-sectional view of the valve element according to a modification.

In the above embodiment, the case where the pair of inner surfaces 50a and 50b intersects with the bottom surface 48 at an acute angle has been described, but the present invention is not limited thereto, and only one of the pair of inner surfaces may intersect at an acute angle. For example, in the groove 110 illustrated in FIG. 8, the inner surface 50b on the tip end side in the axial direction intersects with the bottom surface 48 at a right angle. In other words, the inner surface 50b is along the radial direction. On the other hand, the inner surface 50a on the base end side in the axial direction intersects with the bottom surface 48 at an acute angle. The axial length of the bottom surface 48 is longer than the wire diameter of the O-ring 58, and the axial length between the pair of inner surfaces in the opening provided between the tip ends of the pair of inner surfaces is shorter than the wire diameter of the O-ring 58. Therefore, the valve element including the groove 110 can obtain a desired sealability and can more reliably prevent the O-ring 58 from falling off.

REFERENCE SIGNS LIST

10: Pipe joint
12: Male joint
14: Female joint
16: Male joint main body
20: Valve element
28: Shaft portion
30: Valve portion
34: Coil spring
36: Base end portion
40: Side portion
41: First region
42: First surface
43: Second region
44: Second surface
46: Groove
47: Connection portion
48: Bottom surface
49: Connection portion
50a, 50b: Inner surface
54: Deformation portion
55: Thin portion
58: O-ring
110: Groove
A: Central axis

The invention claimed is:

1. A male joint comprising:
a male joint main body having a cylindrical shape; and
a valve element provided coaxially with a central axis of the male joint main body in the male joint main body,
wherein:
the valve element includes:
a shaft portion having a shaft shape; and
a valve portion having a disk shape coaxially provided at a tip end of the shaft portion;
the valve portion includes:
a base end portion to which the tip end of the shaft portion is connected;
a tip end portion opposite to the base end portion; and
a side portion between the base end portion and the tip end portion;
the base end portion includes:
a first surface intersecting with the central axis;
a second surface connected to an outer edge of the first surface and extending from the first surface to a base end of the male joint along the central axis; and
a first connection portion between the first surface and the second surface;
the side portion includes:
an annular groove centered on the central axis; and
a deformation portion provided on a base end side of the male joint from the groove;
the groove includes:
a bottom surface along the central axis;
a first inner surface extending radially outward from one of end portions of the bottom surface, the one of end portions being located on the base end side in a central axis direction;
a second inner surface extending radially outward from another of end portions of the bottom surface, and
a second connection portion between the first inner surface and the bottom surface; and
the deformation portion includes a thin portion in which a thickness between the first connection portion and the second connection portion is partially thin.

2. The male joint according to claim 1 comprising a coil spring inserted into the shaft portion,
wherein:
the first surface includes:
a first region having an annular shape and centered on the shaft portion; and
a second region having an annular shape and centered on the shaft portion, the second region being on an outer side in a radial direction from the first region;
a tip end of the coil spring is in contact with the first surface in the first region;
the second region is in contact with the second surface at an outer edge of the second region; and
a difference between an outer diameter and an inner diameter of the second region is larger than a difference between an outer diameter and an inner diameter of the first region.

3. The male joint according to claim 1 comprising an O-ring mounted to the groove,
wherein:
an axial length of the bottom surface is longer than a wire diameter of the O-ring; and
an axial length between the first and second inner surfaces in an opening provided between tip ends of the first and second inner surfaces is shorter than the wire diameter of the O-ring.

4. A pipe joint comprising: the male joint according to claim 1; and a female joint into which the male joint is inserted.

* * * * *